US007076456B1

(12) United States Patent
Rofrano

(10) Patent No.: US 7,076,456 B1
(45) Date of Patent: Jul. 11, 2006

(54) SYSTEM AND METHOD FOR AN ADAPTIVE SALES INTERVIEW SEARCH TECHNIQUE

(75) Inventor: John J. Rofrano, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 09/688,715

(22) Filed: Oct. 16, 2000

Related U.S. Application Data

(63) Continuation-in-part of application No. 08/948,719, filed on Oct. 10, 1997, now Pat. No. 6,035,283.

(51) Int. Cl.
*G06F 17/60* (2006.01)
(52) U.S. Cl. .......................... 705/27; 705/26; 707/102; 707/4; 706/11
(58) Field of Classification Search ................ 705/26, 705/27; 707/4, 102; 706/11
See application file for complete search history.

(56) References Cited

U.S. PATENT DOCUMENTS

| 5,666,493 | A | | 9/1997 | Wojcik et al. | |
|---|---|---|---|---|---|
| 5,749,735 | A | | 5/1998 | Redford et al. | |
| 5,758,329 | A | | 5/1998 | Wojcik et al. | |
| 5,835,900 | A | * | 11/1998 | Fagg et al. | 706/11 |
| 5,963,939 | A | * | 10/1999 | McCann et al. | 707/4 |
| 6,035,283 | A | * | 3/2000 | Rofrano | 705/27 |
| 6,070,149 | A | * | 5/2000 | Tavor et al. | 705/26 |
| 6,701,322 | B1 | * | 3/2004 | Green | 707/102 |
| 2002/0004764 | A1 | * | 1/2002 | Stolze et al. | 705/27 |

FOREIGN PATENT DOCUMENTS

DE 0915422 * 2/1998

OTHER PUBLICATIONS

IBM Technical Disclosure, Encoding data into Irrational magic numbers for fast searching and comparing, Nov. 1993.*
Liebowitz, Jay, Expert systems and integral part of knowledge management, Kybernetes, 1998.*

* cited by examiner

*Primary Examiner*—Mark Fadok
(74) *Attorney, Agent, or Firm*—Karna J. Nisewaner; Cantor Colburn LLP

(57) ABSTRACT

An exemplary embodiment of the invention is a system and method for an adaptive sales interview search technique for an electronic catalog. The system includes a customer interface, a host system coupled to the customer interface through a network and a database coupled to the host system. The host system provides, in the electronic catalog, products contained in a database. Also provided by the host system, are questions relating to the products to be presented to a customer who uses the electronic catalog. The host system supplies, in the electronic catalog, likely answers of the customer linked to constraints relative to the products contained in the database. The host system selects the electronic catalog questions in order of ranked importance, presents a highest ranked question, receives an answer to the highest ranked question, applies the constraints based on the answer to the highest ranked question and limits product choices based on the answer to the highest ranked question.

32 Claims, 2 Drawing Sheets

SYSTEM AND METHOD FOR AN ADAPTIVE SALES INTERVIEW SEARCH TECHNIQUE

CROSS-REFERENCE TO RELATED APPLICATIONS

This application is a continuation-in-part of application No. 08/948,719, filed on Oct. 10, 1997, now U.S. Pat. No. 6,035,283.

BACKGROUND OF THE INVENTION

This invention relates generally to an electronic catalog system and, more specifically, to a system and method for an adaptive sales interview search technique.

It is well recognized that procurement systems have traditionally been manual, labor intensive and quite costly operations. Suppliers, for example will do mass mailings of catalogs to potential customers, the customers would browse the catalogs and select items to be purchased and then the customer would complete a paper order form, or call the supplier to order the items. The entire process, from preparing the catalog to receipt of the order, is very labor intensive and often takes several weeks. If a supplier wanted to continually update his catalogs, or provide different price schedules to different customers, the printing, distribution and administrative costs would be substantial.

On a relatively small scale, some suppliers have offered catalogs through computer services, such as PRODIGY (TM). Employing PRODIGY (TM), a computer user can dial-up a service from home and select items to purchase from various catalogs maintained on the system. Upon selection, PRODIGY (TM) initiates the order with the supplier. While this has made significant improvements in typical procurement situations, there are still numerous needs remaining to be fulfilled.

Current electronic catalog systems which service the customer are generally deficient in several ways. First they are very generalized in the information they provide. These systems are not customer-centric in design. Thus they are generally product oriented and rely on human sales associates to make the final sale. Additionally, they do not rely on the personalized characteristics, needs or criteria of the specific buyer in order to narrow the choices of selection to be offered to the customer. This therefore requires excess time on the part of the customer or shopper to browse through the catalog in order to make the proper selection. The current electronic catalog systems are unable to advise shoppers on catalog navigation and product features when shopping for somebody other than themselves such as gift shopping. Thus current electronic catalog systems present all catalog shoppers with the same presentation format based on an internal machine organization of the catalog's content, rather than dynamically generated presentation format based on a customer's individualized personality, interests or needs and a sales representatives experience. This type of Interned electronic catalog business limits the merchant's ability to sell since they still do not have the tools with which to fashion target-sales strategies. As a result the current electronic catalog systems are only slightly better than human-centric, direct-marketing strategies employing time consuming and expensive sales stuff.

Customer interaction with current electronic catalog systems follows one of a plurality of pre-set paths along a decision tree, with the customer input typically being limited to responses to pre-defined choices. Interactive on-line catalog sales applications utilize user responses to questions, which may directly or indirectly relate to products in the category. The customer may indicate his or her interest in defined categories of product information and then be provided with appropriate screens displaying available products from this database. Such systems frequently attempt to direct the information retrieval by first gathering information about the customer and the customer's needs, before posting specific product questions, thereby establishing the appropriate path along the decision tree in advance.

Shortcomings of available prior art search and query tools include the fact that all customers must interact with the system using a limited set of pre-established interactions. In addition, all users must navigate through the pre-set paths and iterations even when the bulk of the information accessible via those paths would not be applicable to that customer's needs nor to the customer's level of familiarity with the available information. The latter shortcoming is particularly significant when one considers provisions of product information over the Internet. With worldwide access, customers from geographically diverse locations will have different requirements on available product sets when interacting with the same electronic catalog. Different shoppers will also have different interaction parameters with respect to the level of product detail that they require. For example, when shopping for a camera, a professional photographer will approach the interaction with more detailed specification constraints than the shopper who is shopping for a camera as a gift. No currently available systems can accommodate any of the foregoing demands.

Thus, contemporary electronic catalog systems are typically lacking in the following areas. They do not facilitate customer oriented selling procedures that use custom personalized sales advice; but rather facilitate a more product-centric advertising process that relies on human sales representatives to make the actual sale. They present all catalog shoppers with the same presentation format based on an internal machine organization of the catalog content rather than a dynamically generated presentation format based on a customer's interests and the vast experience of Sales Representative's, stored in a data base, to device product suggestions for the specific customer.

These current electronic catalog systems handicap and hamper their broad utilization and universal proliferation. Merchants, as a result, still have not tool with which to fashion target-sales strategies. This makes the electronic catalog a poor cousin to human-centric, direct-marketing strategies. They are also unable to incorporate cross-cultural, target-sales strategies into electronic catalogs that are accessed internationally over networks such as the world wide web.

As a further note, when shopping with a current electronic catalog, there is no one available to give the customer assistance short of calling an 800 number and trying to reach a real person for advice. This is not always practical since customers are often already using their telephone via their modem to access the catalog in an on-line system. Customers may also be shopping at off hours and providing 24 hour, 7 day a week service help may be cost prohibitive for merchants. In addition, one who calls an 800 number staff line does not always get consistent advice. This is due in part to the fact that turnover is high for 800 staff numbers and quite often the shopper does not get a "knowledgeable" person to advise them. The alternative is that the shopper must be knowledgeable enough about products they wish to buy, or postpone their buy decision until a time which they can get help from a qualified sales person.

Thus, a better solution is desired.

BRIEF SUMMARY OF THE INVENTION

An exemplary embodiment is a system and method for an adaptive sales interview search technique for an electronic catalog. The system includes a customer interface, a host system coupled to the customer interface through a network and a database coupled to the host system. The host system provides, in the electronic catalog, products contained in a database. Also provided by the host system, are questions relating to the products to be present to a customer who uses the electronic catalog. The host system supplies, in the electronic catalog, likely answers of the customer linked to constraints relative to the products contained in the database. The host system selects the electronic catalog questions in order of ranked importance, presents a highest ranked question, receives an answer to the highest ranked question, applies the constraints based on the answer to the highest ranked question and limits product choices based on the answer to the highest ranked question.

BRIEF DESCRIPTION OF THE DRAWINGS

Referring now to the drawings, wherein like elements are numbered alike in several FIGURES.

DETAILED DESCRIPTION OF THE INVENTION

Other techniques for solving problems associated with the absence of a salesperson during the electronic shopping experience utilize question and answer trees. The invention resolves efficiency problems associated with crafting a question and answer tree because the questions and answers are maintained in a ranked list (i.e.; first, second, third . . . n; 1,2,3 . . . n; A,B,C . . . n; etc.). In other words, each question is assigned a rank from highest to lowest, with no duplication questions (as may occur in the question and answer tree). In general, when sales assistance is requested by a customer, a question ranking the highest is asked first. Based on the answer to the highest ranked question, a question with the next highest rank may be asked. Then, based on the answer to the next highest ranked question, a question with the "new" next highest ranked may be asked, and so on, until no questions are left.

The ranked list is navigated concurrently with the execution of the questions and answers, and, thus, only the question paths needing traversal are presenting to the customer. Each question may be ranked according to importance and without the need to specify which questions should follow each answer. Thus, the question's rank, and relevance of its answers, determines when, and if, a question is asked. Plus, question ranks may be changed without affecting the other questions in the ranked list. Further, only asking relevant questions (without duplication) provides for a fast and efficient solution for solving problems associated with the absence of a salesperson during the electronic shopping experience.

A question is selectively ranked based on its importance. A question's importance may be based on any number of factors, including, but not limited to, an order of questioning that would normally be asked by a generic salesperson if a customer were actually present, statistical data based on the effectiveness of past questions and/or statistical data based on the number of times customers select to answer a particular question. Plus, a question's importance, thus its rank, may be varied when the factors used to determine the rank change.

Figure 1:
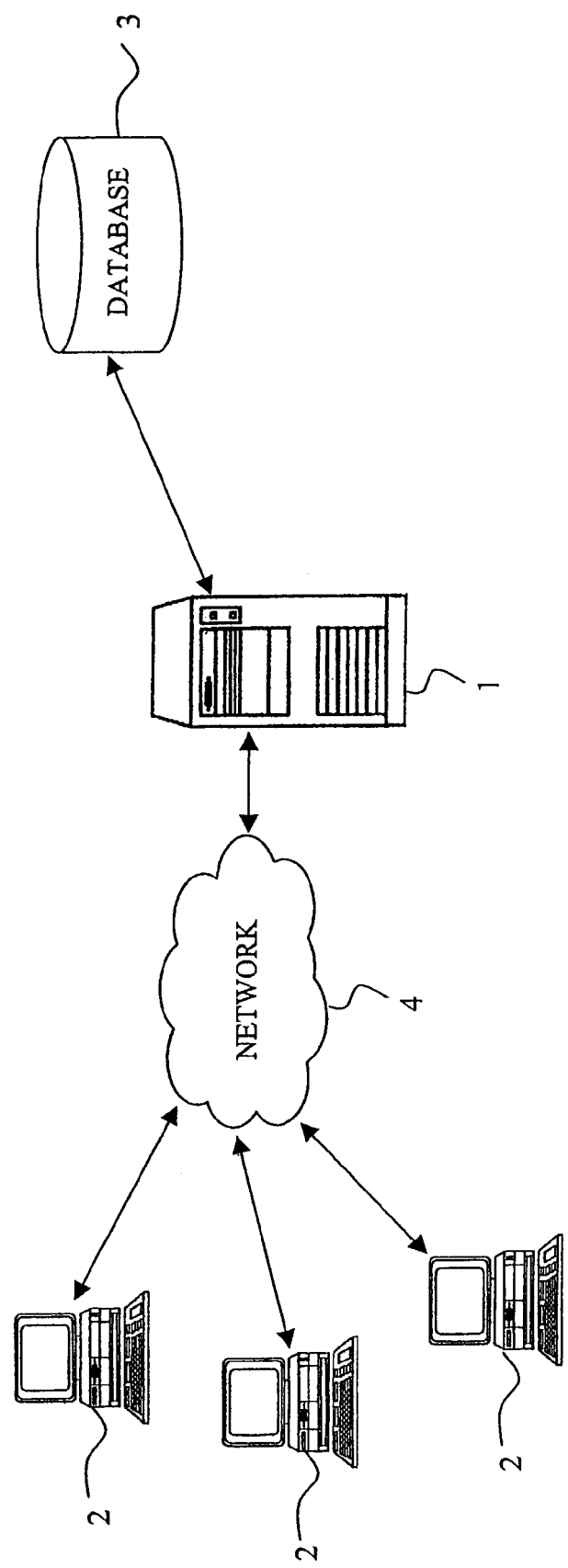
FIG. 1 is a block diagram of an exemplary system for an adaptive sales interview search technique in the preferred embodiment.

FIG. 1 is a block diagram of an exemplary system for an adaptive sales interview search technique in an embodiment. The system includes one or more customer interfaces 2 coupled to a host system 1 via a network 4. Each customer interface 2 may be implement using a general—purpose computer executing a computer program for carrying out the processes described here in. The network 4 may be any type of known network including a local area network (LAN), wide area network (WAN), global network (e.g., Internet), intranet, etc. The customer interfaces 2 may be coupled to the host system 1 through multiple networks (e.g., intranet and Internet) so that not all customer interfaces 2 are coupled to the host system 1 via the network. One or both of the customer interfaces 2 and the host system 1 mat be connected to the network 4 in a wireless fashion and network 4 may be a wireless network. In the preferred embodiment, network 4 is the internet and each customer interface 2 executes a user interface application (e.g., web browser) to contact the host system 1 through the network 4. Alternatively, the customer interface 2 may be implemented using a device programed primarily for accessing network 4 such as WebTV.

The host system 1 may be implemented using a server operating in response to a computer program stored in a storage medium accessible by the server. The host system 1 may operate as a network server (often referred to as a web server) to communicate with the customer interfaces 2. The host system 1 handles sending and receiving information to and from customer interfaces 2 and can perform associated tasks. The host system 1 may also include a firewall to prevent unauthorized access to the host system 1. The firewall may be implemented using conventional hardware and/or software as is known in the art.

The host system 1 also operates as an application server. The host system 1 executes one or more computer programs to interact with a database 3. It is understood that separate servers may be used to implement the network server functions and the applications server functions. Alternatively, the network server, firewall and the applications server can be implemented by a single server executing computer programs to perform the requisite functions.

Database 3 contains a variety of information related to the entity operating the system. In an exemplary embodiment, the system is operated by a product supplier. Changes to database 3 can be made dynamically, in real-time to instantaneously update information accessible by customer interfaces 2. This helps to ensure that items such as new products are kept current. Database 3 allows information to be updated online, in real-time for staff to properly administer customer product selections and provide enhanced service to customers.

An exemplary method for an embodiment shown in the flow chart of FIG. 2 will now be described. First, in step 20, an actual customer initiates a potential electronic catalog purchase and asks for assistance. Next, in step 22, the question with the highest rank (or next highest rank in subsequent steps) is obtained. In step 24, whether the question is relevant is determined. The question is relevant if at least one of its answers is relevant, and an answer is relevant if it has no product constraints or if its product constraints, as combined with all previous answer product constraints, yield a positive or non-zero product count. If the question is relevant, then in step 26, the question and associated answers are presented to the customer. Note that the associated answers may be limited to only relevant answers, thereby precluding the customer from being presented with an answer selection that may result in a zero product count. Next, in step 28, the customer selects an answer. Based on the customers selection, step 30 determines whether constraints on the product selection are required. If so, product selection is constrained in step 32. Regardless of whether or not product selection is constrained, step 34 determines whether to ask another question. If no other questions are to be asked, in step 36, the customer is presented with products meeting the customer's requirements. If other questions remain to be asked, the entire method is repeated, starting with step 22, by obtaining the question with the next highest rank.

If, in step 24, the question is determined to be irrelevant, then step 34 determines whether to ask another question. Again, if no other questions are to be asked, in step 36, the customer is presented with products meeting the customer's requirements. If other questions remain to be asked, the entire method is repeated (starting with step 22), by obtaining the question with the next highest rank.

Figure 2:
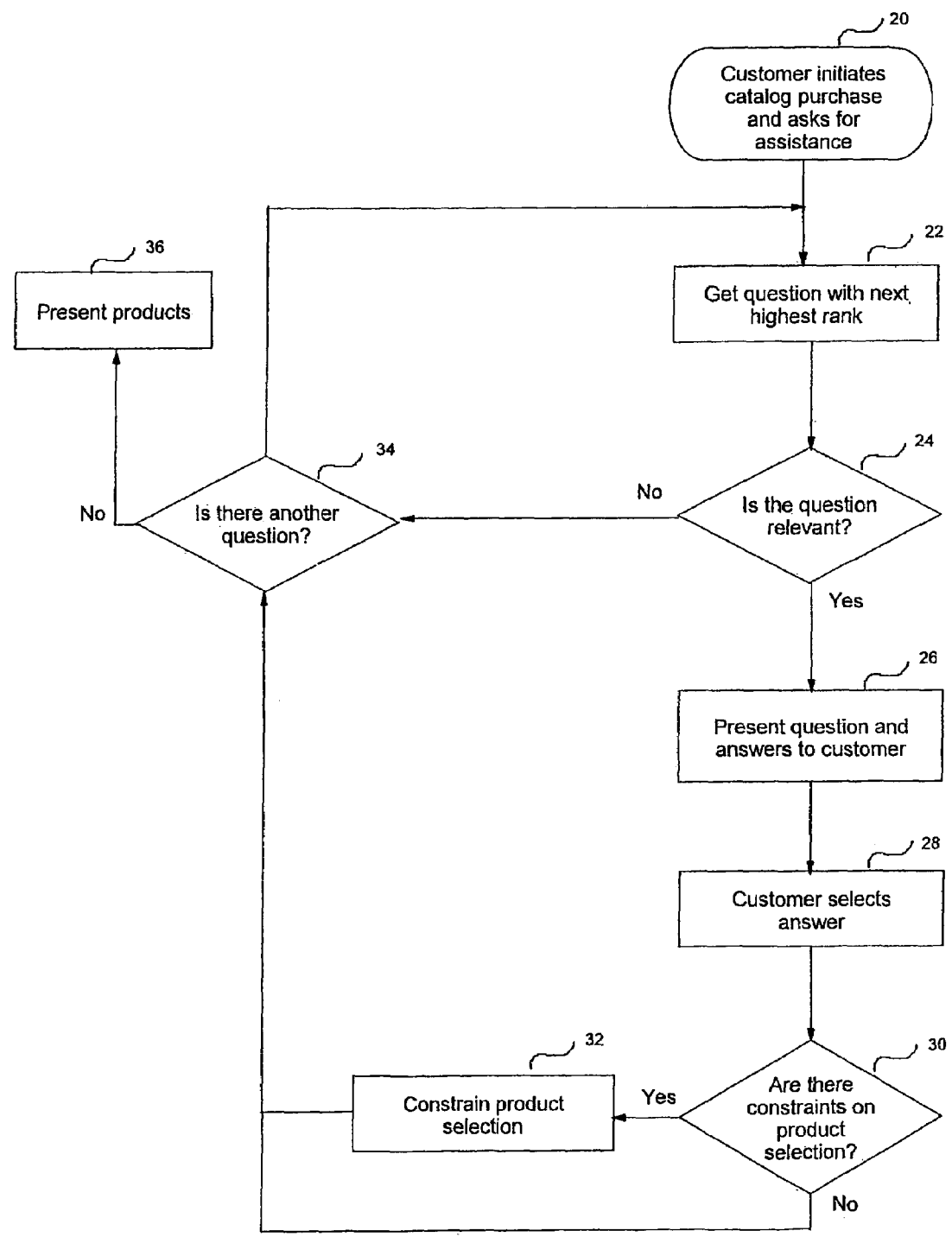
FIG. 2 is a flow chart of an exemplary method for an adaptive sales interview search technique in the preferred embodiment.

In the method of FIG. 2, a host system 1 queries the database and determines which questions to ask. The host system 1 acts on questions that a salesperson would normally ask a customer, if such a salesperson were actually present. Such questions, and associated relevant answers, are created from a database of products and associated features. Feature constraints are created from a list of all possible features for each category of products associated with a particular question. For instance, seven example products were used to develop the ranked list of Table 2, and are shown in Table 1. Table 1 also shows the various possible product features, such as format, light body and price. In the example list of Table 2, various ranked questions, answers and product constraints are shown. As discussed, the host system 1 asks the highest ranked question first. In Table 2, the highest ranked question is, "Are you more interested in high-quality or compatibility?" "High quality" and "Compatibility" being the two possible relevant answers.

TABLE 1

| Product Name | Format | Light | Body | Price |
| --- | --- | --- | --- | --- |
| CamCorder 1 | 8 MM | Built-in | Compact | 500 |
| CamCorder 2 | 8 MM | Optional | Compact | 450 |
| CamCorder 3 | 8 MM | Optional | Compact | 500 |
| HandyCorder 1 | VHS | Built-in | Compact | 525 |
| HandyCorder 2 | VHS | Built-in | Compact | 515 |
| HandyCorder 3 | VHS | Optional | Standard | 410 |
| HandyCorder 4 | VHS | Optional | Standard | 400 |

TABLE 2

| Rank | Question | Answer | Constraints |
| --- | --- | --- | --- |
| 1 | Are you more interested in High quality or Compatibility? | High quality | FORMAT = 8 MM |
|  |  | Compatibility | FORMAT = VHS |
| 2 | Do you plan to take this camera on vacations or trips? | Yes | BODY = Compact |
|  |  | No | BODY = Standard |
| 3 | Will you be using this camera indoors a lot? | Yes | LIGHT = Built-in |
|  |  | No | LIGHT = Optional |

Initially, the product constraints are empty, and all several products of Table 1 are available for selection. But if the customer answers the first ranked question with "High quality," the host system 1 will apply the product constraint of "FORMAT=8 MM." As may be seen in Table 1, this answer limits the product selection to three products: CamCorder 1, CamCorder 2 and CamCorder 3. If the customer answers the first ranked question with "Compatibility," the host system 1 will apply the product constraint of "FORMAT=VHS." As may be seen in Table 1, this answer limits the product selection to four products: HandyCorder 1, HandyCorder 2, HandyCorder 3 and HandyCorder 4.

Next, the host system 1 looks for the next highest ranked question (i.e.: Rank 2) and determines whether it has any relevant answers, given the constraints of the previous answer. If all the answers to the next highest ranked question would result in a zero product count (when the constraints are combined with the existing constraints), the question is determined to be irrelevant. In that case the host system 1 searches for the next highest ranked question with relevant answers, given the constraints of the previous answer. As mentioned, in the example of Table 2, if the answer in the highest ranked question is "High quality," then the product constraint is "FORMAT=8 MM." For this constraint, the host system 1 finds the next highest ranked question is "Do you plan to take this camera on vacation on trips?" Although all the products with an 8 MM format only come with compact bodies, the next highest ranked question is not disqualified as irrelevant. However, since only the "Yes" answer has a positive product count (i.e.; "BODY=Compact"), the question is not actually presented to the customer. In other words, the customer is not burdened with answering a question having only one relevant answer. Instead, the host system 1 automatically selects the relevant answer, and adds its constraints to the list of existing product constraints.

On the other hand, if the answer in the highest rank to question is "Compatibility," then the product constraint is "FORMAT=VHS." Therefore, the question "Do you plan to take this camera on vacation or trips?" is actually presented to the customer. This is because both answers have a positive product count (i.e.; "BODY=Compact;" "BODY=Standard").

Next, the host system 1 searches for the next highest ranked question. In the example of Table 2, the next highest ranked question is "Will you be using this camera indoors a lot?" The host system 1 determines that each answer to this question yields a positive product count (whether or not the highest ranked question yielded a product constraint of "FORMAT=8 MM" or "FORMAT=VHS"). Therefore, the question is presented to the customer. In the example having an initial product constraint of "FORMAT=8 MM," a "Yes" answer adds the product constraint "LIGHT=Built-in" to the list of product constraints. The host system 1 searches for the next highest ranked question, and in this example, determines that no more questions with relevant answers exist. Therefore, the product constraints become "FORMAT=8 MM," "BODY=Compact" and "LIGHT=Built-in," yielding one product that meets the constraints. Finally, as can be determined from Table 1, CamCorder 1 is presented to the customer.

The above description and examples illustrate how efficiently a series of questions are handled by executing a ranked list, wherein, if a question's answers are irrelevant (or contain only one relevant answer), the question is automated deleted (or the constraints of the only relevant answer are automatically applied). Therefore, redundancy is eliminated and no manual "pruning" from a question and answer tree is required.

As described above, embodiments in the form of computer-implemented processes and apparatuses for practicing those processes may be included. Embodiments may include those in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Further, embodiments may include those in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A system for an adaptive sales interview search technique for an electronic catalog, the system comprising:
   a customer interface;
   a host system coupled to said customer interface through a network, the host system performing;
      system providing in said electronic catalog products contained in a database;
      providing in said electornic catalog questions relating to said produces to be presented to a customer using said electronic catalog;
      supplying in said electronic catalog likely answers of the customer linked to constraints relative to said products contained in said database;
      selectings and electronic catalog questions in order of a ranked importance, said ranked importance independent of any previous answer provided by said customer;
      presenting a highest ranked question;
      receiving an answer to said highest ranked question;
      determining a next highest ranked question, said determining including searching for said next highest ranked question containing at least one relevant answer, the searching including presenting said next highest ranked question if said next higher ranked question contains at least two relevant answers;
      presenting said next highest ranked question;
      receiving an answer to said next highest ranked question;
      applying constraints based on said answer to said highest ranked question and said next highest ranked question; and
      limitings product choices based on said answer to said highest ranked question and said answer to said next highest ranked question; and
   a database coupled to said host system.

2. The system of claim 1, wherein said highest ranked questions is presented by a graphics display device.

3. The system of claim 1, wherein said highest ranked question is presented by an audio device.

4. The system of claim 1, wherein said host system receiving said answer comprises said host system receiving at least one answer from a plurality of predetermined answers.

5. The system of claim 4, wherein each of said plurality of predetermined answers is relevant.

6. The system of claim 1, wherein said host system searching includes:
   said host system determining whether said next highest ranked question contains one relevant answer; and
   said host system applying said constraints based on said one relevant answer without presenting said next highest ranked question.

7. The system of claim 1, further including:
   said host system determining a new next highest ranked question based on said ranked importance and said answer to said next highest ranked question;
   said host system iteratively repeating said host system presenting, said host system receiving, said host system applies and said host system determining for said new next highest ranked question until said new next highest ranked question is not relevant; and
   wherein said host system limits said product choices based on answers to said highest ranked question, said next highest ranked question and new next highest ranked questions.

8. The system of claim 7, wherein said host system determining includes said host system searching for said new highest ranked question containing at least one relevant answer.

9. The system of claim 8, wherein said host systems searching includes said host system presenting said new next highest ranked question if said next highest ranked question contains at least two relevant answers.

10. The system of claim 8, wherein said host system searching includes:
    said host system determining whether said new next highest ranked question contains one relevant answer; and
    said host system applying said constraints based on said one relevant answer without presenting said new next highest ranked question.

11. A method for an adaptive sales interview search technique for an electronic catalog including products contained in a database, questions relating to the products to be presented to a customer using the electronic catalog and likely answers of the customer linked to constraints relative to the products, the method the computer implemented steps of comprising:
    selectively ranking said electronic catalog questions in order of importance, said ranking independent of any previous answers provided by said customer;
    presenting a highest ranked question;
    receiving an answer to said highest ranked question;
    determining a next highest ranked question based on said ranking and said answer to said highest ranked question;
    presenting said next highest ranked question;
    receiving an answer to said next highest ranked question;
    determining a new next highest ranked question based on said ranking and said answer to said next highest ranked question;

iteratively repeating said presenting, said receiving, said applying and said determining for said new next highest ranked question until said now next highest ranked question is not relevant;

applying constraints based on said answer to said highest ranked question, said next highest ranked question, and said new next highest question; and wherein limiting product choices based on answers to said highest ranked question, said next highest ranked question and said new next highest ranked question.

12. The method of claim 11, wherein said presenting is by a graphics display device.

13. The method of claim 11, wherein said presenting is by an audio device.

14. The method of claim 11, wherein said receiving said answer comprises receiving at least one answer from a plurality of predetermined answers.

15. The method of claim 14, wherein each of said plurality of predetermined answers is relevant.

16. The method of claim 11, wherein said determining includes searching for said next highest ranked question containing at least one relevant answer.

17. The method of claim 16, wherein said searching includes presenting said next highest ranked question if said next highest ranked question contains at least two relevant answers.

18. The method of claim 16, wherein said searching includes:

determining whether said next highest ranked question contains one relevant answer; and applying said constraints based on said one relevant answer without presenting said next highest ranked question.

19. The method of claim 11, wherein said determining includes searching for said next highest ranked question containing at least one relevant answer.

20. The method of claim 19, wherein said searching includes presenting said new next highest ranked question if said new next highest ranked question contains at least two relevant answers.

21. The method of claim 19, wherein said searching includes:

determining whether said new next highest ranked question contains one relevant answer; and applying said constraints based on said one relevant answer without presenting said new next highest ranked question.

22. A storage medium encoded with machine-readable computer program code for an adaptive sales interview search technique for an electronic catalog including products contained in a database, questions relating to the products to be presented to a customer using the electronic catalog and likely answers of the customer linked to constraints relative to the products, said storage medium including instructions for causing a processor to implement a method comprising:

selectively ranking said electronic catalog questions in order of importance, said ranking independent of any previous answers provided by said customer;

presenting a highest ranked question;

receiving an answer to said highest ranked question;

determining a next highest ranked question based on said ranking and said answer to said highest ranked question;

presenting said next highest ranked question;

receiving an answer to said next highest ranked question;

determining a new next highest ranked question based on said ranking and said answer to said next highest ranked question;

iteratively repeating said presenting, said receiving, said applying and said determining for said new next highest ranked question until said new next highest ranked question is not relevant;

applying constraints based on said answer to said highest ranked question, said next highest ranked question, and said new next highest question; and limiting product choices based on answers to said highest ranked question, said next highest ranked question and said new highest ranked question.

23. The storage medium of claim 22, wherein said presenting is by a graphics display device.

24. The storage medium of claim 22, wherein said presenting is by an audio device.

25. The storage medium of claim 22, wherein said receiving said answer comprises receiving at least one answer from a plurality of predetermined answers.

26. The storage medium of claim 25, wherein each of said plurality of predetermined answers is relevant.

27. The storage medium of claim 22, wherein said determining includes instructions for causing said processor to implement searching for said next highest ranked question containing at least one relevant answer.

28. The storage medium of claim 27, wherein said searching includes instructions for causing said processor to implement presenting said next highest ranked question if said next highest ranked question contains at least two relevant answers.

29. The storage medium of claim 27, wherein said searching includes instructions for causing said processor to implement:

determining whether said next highest ranked question contains one relevant answer; and applying said constraints based on said one relevant answer without presenting said next highest ranked question.

30. The storage medium of claim 22, wherein said determining includes instructions for causing said processor to implement searching for said next highest ranked question containing at least one relevant answer.

31. The storage medium of claim 30, wherein said searching includes instructions for causing said processor to implement presenting said new next highest tanked question if said new next highest ranked question contains at least two relevant answers.

32. The storage medium of claim 30, wherein said searching includes instructions for causing said processor to implement:

determining whether said next highest ranked question contains one relevant answer; and applying said constraints based on said one relevant answer without presenting said new next highest ranked question.

* * * * *

UNITED STATES PATENT AND TRADEMARK OFFICE
CERTIFICATE OF CORRECTION

| | | |
|---|---|---|
| PATENT NO. | : 7,076,456 B1 | Page 1 of 1 |
| APPLICATION NO. | : 09/688715 | |
| DATED | : July 11, 2006 | |
| INVENTOR(S) | : John J. Rofrano | |

It is certified that error appears in the above-identified patent and that said Letters Patent is hereby corrected as shown below:

Column 9,
Line 3, change "said now next" to -- said new next --.

Signed and Sealed this

Seventeenth Day of May, 2011

David J. Kappos
*Director of the United States Patent and Trademark Office*